United States Patent [19]

Dahl

[11] 4,142,266
[45] * Mar. 6, 1979

[54] METHOD FOR CREATING OVERLOAD PROTECTION AGAINST YIELDING IN BOLTS

[76] Inventor: Norman C. Dahl, 40 Fern St., Lexington, Mass. 02173

[*] Notice: The portion of the term of this patent subsequent to Jul. 26, 1994, has been disclaimed.

[21] Appl. No.: 816,265

[22] Filed: Jul. 18, 1977

Related U.S. Application Data

[63] Continuation-in-part of Ser. No. 693,546, Jun. 7, 1976, Pat. No. 4,037,282.

[51] Int. Cl.² .............................................. F16B 31/02
[52] U.S. Cl. ........................................ 10/27 R; 29/407; 29/526 R; 73/761
[58] Field of Search .................... 29/407, 516, 452; 85/1 T, 62; 81/52.4 R; 73/88 F, 139; 10/27 R, 27 H

[56] References Cited

U.S. PATENT DOCUMENTS

| 4,016,938 | 4/1977 | Rice | 73/88 F |
| 4,026,369 | 5/1977 | Vliet | 73/139 X |
| 4,037,282 | 7/1977 | Dahl | 10/27 R |

Primary Examiner—Leon Gilden
Attorney, Agent, or Firm—Richard P. Crowley

[57] ABSTRACT

An improved method for creating built-in overload protection against further yielding in a bolt which previously has been tightened to its yield point, the method comprising rotating the bolt head or nut in the direction opposite from tightening while measuring the wrenching torque required for this rotation and stopping the rotation when the magnitude of the wrenching torque indicates that the torque acting in the bolt shank is fifty percent or less of the value existing at the end of tightening; and, a pulsed air motor wrench which at the end of tightening a bolt to its yield point automatically shifts to an untightening mode of operation and stops untightening when the untightening wrenching torque becomes equal to or exceeds the value $CT_{WY}$ wherein C is a numerical constant determined theoretically or experimentally and $T_{WY}$ is the wrenching torque acting at the end of tightening.

5 Claims, 5 Drawing Figures

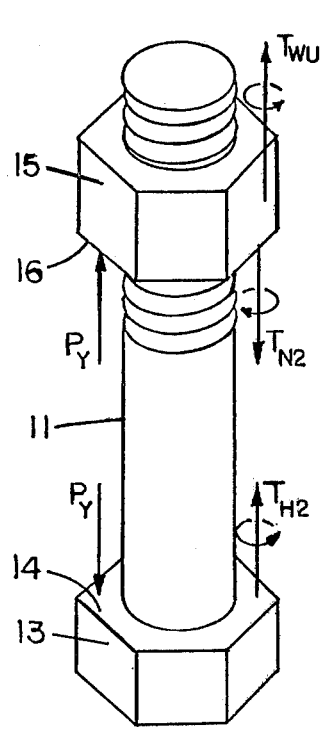
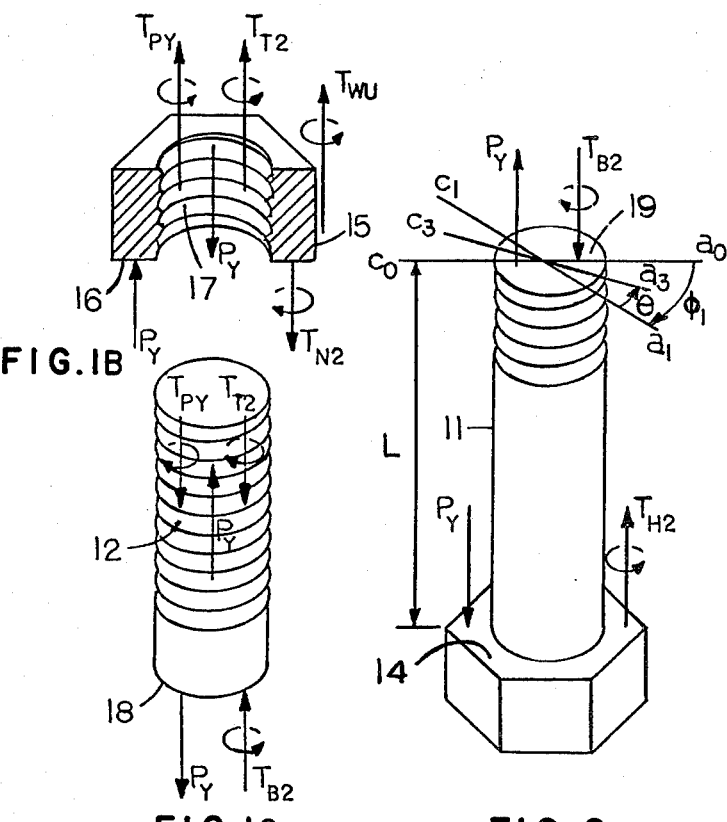
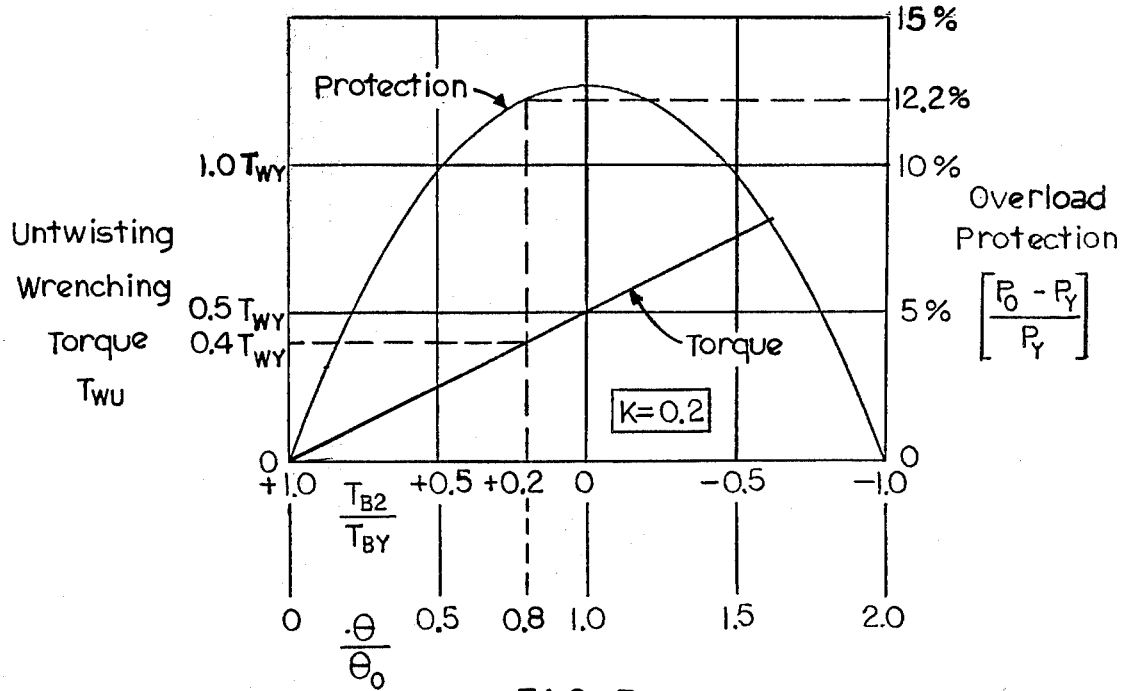
FIG.1A  FIG.1B  FIG.1C  FIG.2
FIG.3

METHOD FOR CREATING OVERLOAD PROTECTION AGAINST YIELDING IN BOLTS

REFERENCE TO PRIOR APPLICATION

This application is a continuation-in-part of U.S. application Ser. No. 693,546, filed June 7, 1976 (now U.S. Pat. No. 4,037,282, issued July 26, 1977).

BACKGROUND OF THE INVENTION

It is becoming standard practice in many bolting situations to tighten bolts until they reach their yield point. There are many advantages in tightening bolts to their yield point. An article entitled "Fastener Tension Control—What It's All About" in the November 1976 issue of *Assembly Engineering* gives an excellent summary of the advantages of such tightening and describes several state-of-the-art wrenching systems which are being used for such tightening; this article is herein incorporated by reference.

One problem encountered when a bolt is tightened to its yield point is that the bolt then has no built-in overload protection against further yielding or against loss of preload. I outlined the nature of this problem and gave a process for dealing with it in my co-pending application. "Process for Creating Overload Protection Against Yielding in Bolts," Ser. No. 693,546, which will become U.S. Pat. No. 4,037,282 on July 26, 1977, herein incorporated by reference.

SUMMARY OF THE INVENTION

The process I patented in U.S. Pat. No. 4,037,282 provides for creating built-in overload protection against further yielding in a bolt which has been tightened to its yield point by subsequently rotating the bolt head or nut in the direction opposite from tightening through an angle $\theta$ such that the reduction in twist of the bolt shank causes the torque acting in the shank to reduce to fifty percent or less of the value existing at the end of tightening, but where the angle $\theta$ is not large enough to cause decrease in the tension existing in the bolt at the end of tightening. This method, under average conditions of friction, will create in the bolt a built-in overload protection of at least 10 percent; that is, the bolt will not yield further until the tension acting in the bolt increases at least 10 percent beyond the tension existing at the end of tightening.

Subsequent to filing Ser. No. 693,546 I have made further invention in this field. One aspect of the invention is an improvement on the method of U.S. Pat. No. 4,037,282 wherein the improvement consists of using the magnitude of the untwisting wrenching torque, as compared with the magnitude of the wrenching torque acting at the end of tightening the bolt, as a measure of the magnitude of the torque remaining acting in the bolt shank and, therefore, as a guide to when to stop the untwisting rotation of the bolt head or nut so as to have the desired built-in overload protection in the bolt.

A second aspect of the invention consists of using this improvement in method to design a relatively simple addition to an existing wrench so that the resulting wrench, after tightening a bolt to its yield point, automatically shifts into an untightening mode of operation and automatically stops the untwisting at the point when the torque remaining in the bolt shank is in the desired range, namely, when this torque is fifty percent or less of the value existing at the end of tightening.

BRIEF DESCRIPTION OF THE DRAWINGS

FIG. 1 depicts a bolt-nut combination which previously has been tightened until the bolt reached its yield point and shows the external and internal forces and torques existing when the nut is acted on by an untwisting wrenching torque $T_{WU}$ which rotates the nut in the direction opposite from tightening.

FIG. 2 illustrates the twist and torque conditions in the bolt of FIG. 1.

FIG. 3 shows both how the amount of overload protection created in the bolt varies when the torque $T_{B2}$ acting in the bolt shank is reduced to differing levels below the value $T_{BY}$ existing at the end of tightening and how the torque $T_{B2}$ is related to the untwisting wrenching torque $T_{WU}$.

DESCRIPTION OF THE PREFERRED EMBODIMENT

When a bolt is tightened by a wrenching torque $T_{WY}$, as illustrated in FIG. 2a of U.S. Pat. No. 4,037,282, many measurements under varying conditions of friction and surface finish have established (see page 23 of *Assembly Engineering* article) that the wrenching torque $T_{WY}$ is proportionally related to the bolt tension $P_Y$ as follows $$T_{WY} = KDP_Y \tag{1}$$

where D is the nominal diameter of the bolt and K is an experimentally determined torque coefficient related to the finish and friction conditions which for normal dry surfaces and normal unlubricated bolts has the value of about 0.2. Referring to FIG. 2b of U.S. Pat. No. 4,037,282 which shows the various torques acting on the nut, these same experimental measurements have established that the torque $T_{PY}$ resulting from the bolt tension acting on the helically inclined threads, the torque $T_{TY}$ generated by the rotational slip of the nut threads relative to the bolt threads, and the torque $T_{NY}$ generated on the bearing surface 16 of the nut as it slips rotationally on its abutting surface have approximately the following values $$T_{PY} = 0.1 \, T_{WY}$$
$$T_{TY} = 0.4 \, T_{WY} \tag{2}$$
$$T_{NY} = 0.5 \, T_{WY}$$

U.S. Pat. No. 4,037,282 gives a detailed analysis of the internal and external forces and torques acting as the bolt of FIG. 2 of that patent is tightened by rotation of the nut 15 under the influence of a tightening wrenching torque which reaches the value $T_{WY}$ when the bolt reaches its yield point. As illustrated in FIG. 3 of U.S. Pat. No. 4,037,282, during this tightening the cross sectional surface 19 of the bolt shank 11 rotates through an angle $\phi_1$ relative to the other end of the shank located at the bolt head bearing surface 14. The analysis in U.S. Pat. No. 4,037,282 then continues and examines what happens when, subsequently, the nut is rotated through an angle $\theta$ in the direction opposite from tightening in such a manner that the bearing surface 16 of the nut slips rotationally relative to its abutting bearing surface but the mating nut threads 17 and bolt threads 12 do not slip rotationally with respect to each other. This analysis finds that when the nut is rotated in this manner there is no decrease in the bolt tension $P_Y$ which existed when the bolt reached its yield point at the end of tightening, but as a consequence of the reduction $\theta$ in the twist of the bolt shank the torque $T_{B2}$ acting in the bolt shank is decreased below the value $T_{BY}$ which existed at the end of tightening. With this reduction in $T_{B2}$ the analysis shows that the bolt will not undergo further yielding until the bolt tension subsequently, due to changing loading conditions, reaches some higher value $P_O$ which is related to bolt tension $P_Y$ in the following manner (equation (Q) of U.S. Pat. No. 4,037,282)

$$\frac{P_O}{P_Y} = \sqrt{1 + \frac{27}{4} K^2 \left[1 - \left(\frac{T_{B2}}{T_{BY}}\right)^2\right]} \tag{3}$$

The consequences of equation (3) are shown in the parabolic curve plotted in FIG. 3 (for the average value of K = 0.2). This plot shows that 10 percent or more of overload protection can be created if the torque $T_{B2}$ acting in the bolt shank can be reduced to about half or less of the value $T_{BY}$ existing at the end of tightening. The plot in FIG. 3 shows that this overload protection also is created when the torque in the bolt shank is reversed, so long as its absolute magnitude is less than half $T_{BY}$. In FIG. 3 the angle $\theta_O$ is the rotation of the nut which will bring the value of $T_{B2}$ to zero and has the value (equation (T) of U.S. Pat. No. 4,037,282)

$$\theta_O = 0.5 \frac{T_{WY} L}{G I_z} \tag{4}$$

where
$I_z = \pi D^4 / 32$
G = Shear modulus = $11.5 \times 10^6$ psi for steel and $\theta_O$ is in radians.

The scales along the bottom of FIG. 3 show that the torque $T_{B2}$ is linearly related to the angle of untwisting rotation $\theta$ and the form of this relationship is (equation (S) of U.S. Pat. No. 4,037,282)

$$T_{B2} = T_{BY}\left[1 - \frac{\theta}{\theta_O}\right] \tag{5}$$

Since $T_{BY}$ is the torque acting in the bolt shank at the end of tightening, with the use of equation (D) of U.S. Pat. No. 4,037,282 the magnitude of $T_{B2}$ is seen to be $$T_{B2} = 0.5 T_{WY}\left[1 - \frac{\theta}{\theta_O}\right] \tag{6}$$

During the untightening the rotation $\theta$ is kept small enough so the nut does not rotate with respect to the bolt; if the nut rotated with respect to the bolt the bolt tension would decrease below the value $P_Y$ it had at the end of tightening. Because the bolt tension remains at $P_Y$, the torque $T_{PY}$ will have the same value it had at the end of tightening, namely, the value given in equation (2)

$$T_{PY} = 0.1 T_{WY} \tag{7}$$

Also because the tension remains at the value $P_Y$, the frictional torque $T_{N2}$ generated on the bearing surface 16 of the nut will have the same magnitude as the frictional torque acting on this surface at the end of tightening, namely, the magnitude given in equation (2)

$$8c \quad T_{N2} = 0.5 T_{WY} \tag{8}$$

although, as illustrated in FIG. 1, its direction will be the reverse of its direction during tightening (see FIG. 2 of U.S. Pat. No. 4,037,282).

Since $\theta$ will be small enough so there is no rotation of the nut relative to the bolt, i.e. there will be no tendency for slipping between the nut and bolt threads, the frictional torque $T_{T2}$ acting between the nut and bolt threads will be of whatever magnitude and direction is required to maintain rotational equilibrium, subject only to the restriction that its magnitude cannot exceed the maximum frictional torque which can be generated between the thread surfaces of the nut and bolt when the bolt tension is $P_Y$, namely, the magnitude at the end of tightening as given in equation (2)

$$|T_{T2}|_{max} = 0.4 T_{WY} \tag{9}$$

Rotational equilibrium of the threaded end of the bolt shown in FIG. 1c requires that $$T_{T2} + T_{PY} = T_{B2} \tag{10}$$

Substituting $T_{PY}$ from equation (7) and $T_{B2}$ from equation (6) $T_{T2}$ can be expressed as $$T_{T2} = 0.4 T_{WY} - 0.5 T_{WY}\frac{\theta}{\theta_O} \tag{11}$$

It may be seen from equation (11) that $T_{T2}$ reaches the value $-0.4 T_{WY}$ when the nut has been rotated through an angle $\theta = 1.6 \theta_O$ and therefore, in view of equation (9), $\theta = 1.6 \theta_O$ is the maximum angle through which the nut can be rotated without causing the tension in the bolt to decrease below the value $P_Y$ existing at the end of tightening.

Rotation of the nut in the direction opposite from tightening will require an unwinding wrenching torque acting on the nut in the direction shown by the wrenching torque $T_{WU}$ in FIG. 1a. Rotational equilibrium of the nut shown in FIG. 1b requires that $$T_{WU} = T_{N2} - (T_{T2} + T_{PY}) \tag{12}$$

Substituting $T_{N2}$ from equation (8) and $(T_{T2} + T_{PY})$ from equation (10) gives the following relation for $T_{WU}$ $$T_{WU} = 0.5 T_{WY} - T_{B2} \tag{13}$$

and substituting $T_{B2}$ from equation (6), the value of the unwinding wrenching torque $T_{WU}$ becomes $$T_{WU} = 0.5 T_{WY}\frac{\theta}{\theta_O} \tag{14}$$

Equation (14) is plotted in FIG. 3. The straight line representing equation (14) is terminated at $\theta = 1.6 \theta_O$ because equation (14) holds only so long as there is no rotation of the nut relative to the bolt.

As an example of the use of FIG. 3, a rotation of $\theta = 0.8 \theta_O$ will result in reduction of bolt shank torque to $T_{B2} = 0.2 T_{BY}$, will require an untwisting wrenching torque of magnitude $0.4 T_{WY}$, and will create in the bolt an overload protection of 12.2 percent.

It will be seen from FIG. 3 that an overload protection of 10 percent or more will be produced over the very wide range of untwisting wrenching torque spanning from 0.25 $T_{WY}$ to 0.75 $T_{WY}$.

The most sensible design criterion appears to be to aim at reducing the torque in the bolt shank to zero, namely, to rotate the nut until the untwisting wrenching torque $T_{WU}$ reaches the value $$T_{WU_{Design}} = 0.5\ T_{WY} \qquad (15)$$

Wrenching torque variations of 50 percent about the design value given in equation (15), namely, variations from $0.25T_{WY}$ to $0.75T_{WY}$, will still create overload protection of 10 percent or more.

While there is much experimental evidence supporting the values of torques given in equation (2), on which the design untwisting wrenching torque criterion in equation (15) is based, it will be prudent to conduct untwisting experiments in which the torque in the bolt shank is actually measured and the data are analyzed and fitted to the equation $$T_{WU_{Design}} = C\ T_{WY} \qquad (16)$$

and experimental values for the numerical constant C are determined for different conditions. For some conditions the value of C obtained from experiments may differ from the theoretical value of 0.5 given in equation (15) but, as pointed out above, it will take very large differences to cause substantial reductions in the overload protection created in the bolts.

On pages 25-30 of the *Assembly Engineering* article there is a description of a pulsed air motor wrench which has the capability to tighten a bolt and automatically stop the tightening process when the bolt reaches its yield point. The major components and features of this wrench include: a wrenching means for applying torque to a bolt head or nut; an air motor for delivering torque to the wrenching means; a fast-acting air control valve for delivering pressurized air to the air motor for a very short time interval, as short as 0.003 seconds, so that the wrenching means delivers a sequence of rotational impulses to the bolt head or nut; a means for regulating the pressure of the air supplied to the fast-acting air control valve; an electro-mechanical torque transducer which measures the wrenching torque imparted during each rotational impulse; a yield detecting circuit which compares the wrenching torque magnitude during the current impulse with the wrenching torque magnitude of the previous impulse and computes the incremental increase in the wrenching torque; and a shut-off integrator logic circuit which, between each impulse, compares the incremental increase in wrenching torque with some predetermined value stored in memory and when the incremental increase drops to this predetermined value sends a signal to the fast-acting air control valve which inhibits the valve from sending the next pulse of air to the air motor and shuts off the wrench.

With my special knowledge of the physics of what happens when a bolt is untwisted with the objective of providing built-in protection against further yielding without decreasing the tension in the bolt, I have perceived that the pulsating operation of this wrench which delivers wrenching impulses of very short duration to the bolt makes it possible to adapt the wrench, by adding a few components and features, so it will have the additional capability to create overload protection in bolts which have been tightened to their yield point and to do this accurately.

As I explained in U.S. Pat. No. 4,037,282, because the amount of nut rotation required to create the desired overload protection is very small and because the sliding coefficient of friction is less than the static coefficient, a prevailing torque wrench is likely to overshoot the desired angle of untwisting rotation of the nut or bolt head and cause decrease of tension in the bolt. I also explained how an impact wrench could produce a sequence of small increments of rotation which add up to the desired angle of rotation and developed a quantitative expression (see equation (Z) of U.S. Pat. NO. 4,037,282) for the number of impacts required. I have perceived that an air wrench which operates in a pulsating mode also will produce a sequence of small increments of rotation and therefore, like the impact wrench, easily can be controlled so as to avoid overshooting the desired angle of untwisting rotation.

Since the pulsed air motor wrench described in the *Assembly Engineering* article already incorporates means for measuring the wrenching torque imparted during each rotational wrenching impulse, the only major components and features needed to be added to this wrench to give it the capability to automatically produce overload protection in a bolt after previously tightening the bolt to its yield are the following: provision of a means for reversing the drive connection between the air motor and the wrenching means so the direction of rotation of the wrenching means can be reversed after completion of tightening of the bolt; provision of an overload protection logic circuit which would be activated automatically upon completion of tightening and would store in its memory the torque value $CT_{WY}$ (equation (16)) wherein $T_{WY}$ is the wrenching torque acting during the last impulse of tightening, would cause the direction of the wrenching means to be reversed, would cause the pressure of the air supplied to the fast-acting air control valve to be reduced to a level appropriate for the untwisting, would send a start-up signal to the fast-acting air control valve to initiate air pulsing, and would compare the wrenching torque magnitude during each impulse with the torque value $CT_{WY}$ stored in its memory and send a shut-off signal to the fast-acting air control valve when the wrenching torque becomes equal to or greater than $CT_{WY}$. These are standard components and features whose addition to the existing wrench can be carried out easily by those skilled in the art of wrenches once the conceptual framework is presented to them.

I claim:

1. In a method for creating built-in overload protection against further yielding in a threaded bolt which previously has been tightened to its yield point, which method comprises rotating the bolt head or nut in the direction opposite from tightening through an angle $\theta$ such that the reduction in twist of the bolt shank causes the torque acting in said shank to reduce to fifty percent or less of the value existing at the end of tightening and where said angle of rotation $\theta$ is not large enough to cause decrease in the tension existing in said bolt at the end of tightening, wherein the improvement comprises measuring the wrenching torque $T_{WU}$ required to rotate said bolt head or said nut and stopping said rotation when the magnitude of said wrenching torque $T_{WU}$ indicates that said torque acting in said shank is fifty percent or less of the value existing at the end of tightening.

2. The method of claim 1 which includes stopping said rotation when the magnitude of said wrenching torque $T_{WU}$ reaches the value $CT_{WY}$ wherein C is a numerical constant determined theoretically or experimentally and $T_{WY}$ is the wrenching torque acting at the end of tightening said bolt to its yield point.

3. The method of claim 2 wherein said numerical constant C has the value 0.5.

4. The method of claim 2 wherein said rotation is produced by an impact wrench which delivers rotational impacts to said bolt head or said nut and said wrenching torque $T_{WU}$ is measured during each said impact.

5. The method of claim 2 wherein said rotation is produced by a pulsed air motor wrench which delivers rotational impulses to said bolt head or said nut and said wrenching torque $T_{WU}$ is measuring during each said impulse.

* * * * *